March 12, 1957
F. G. CLARK
2,784,820
REVERSING POWER TRANSMISSION MECHANISM, ESPECIALLY FOR GARDEN TRACTORS
Filed June 30, 1952
3 Sheets-Sheet 1
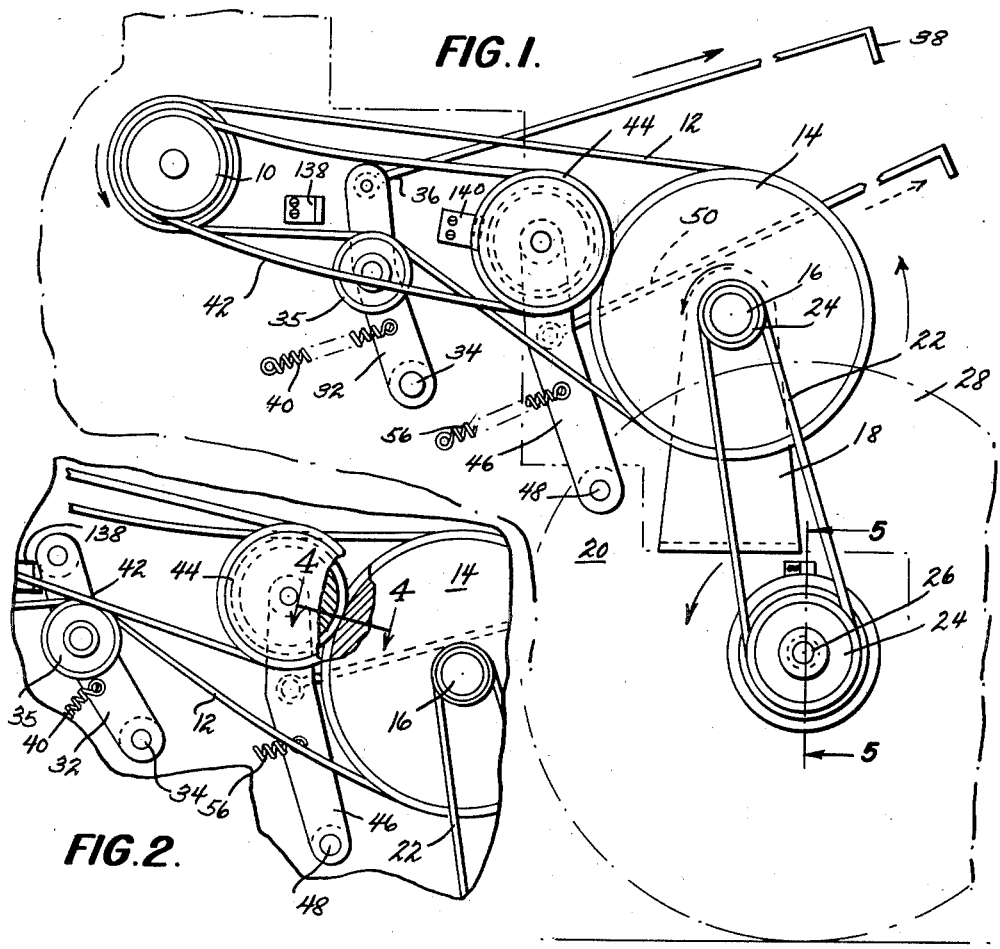
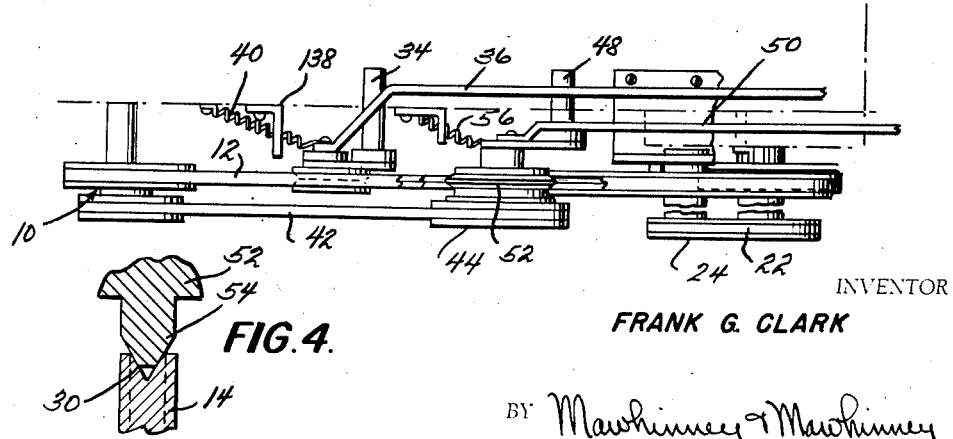
INVENTOR
FRANK G. CLARK
BY *Mawhinney & Mawhinney*
ATTORNEYS

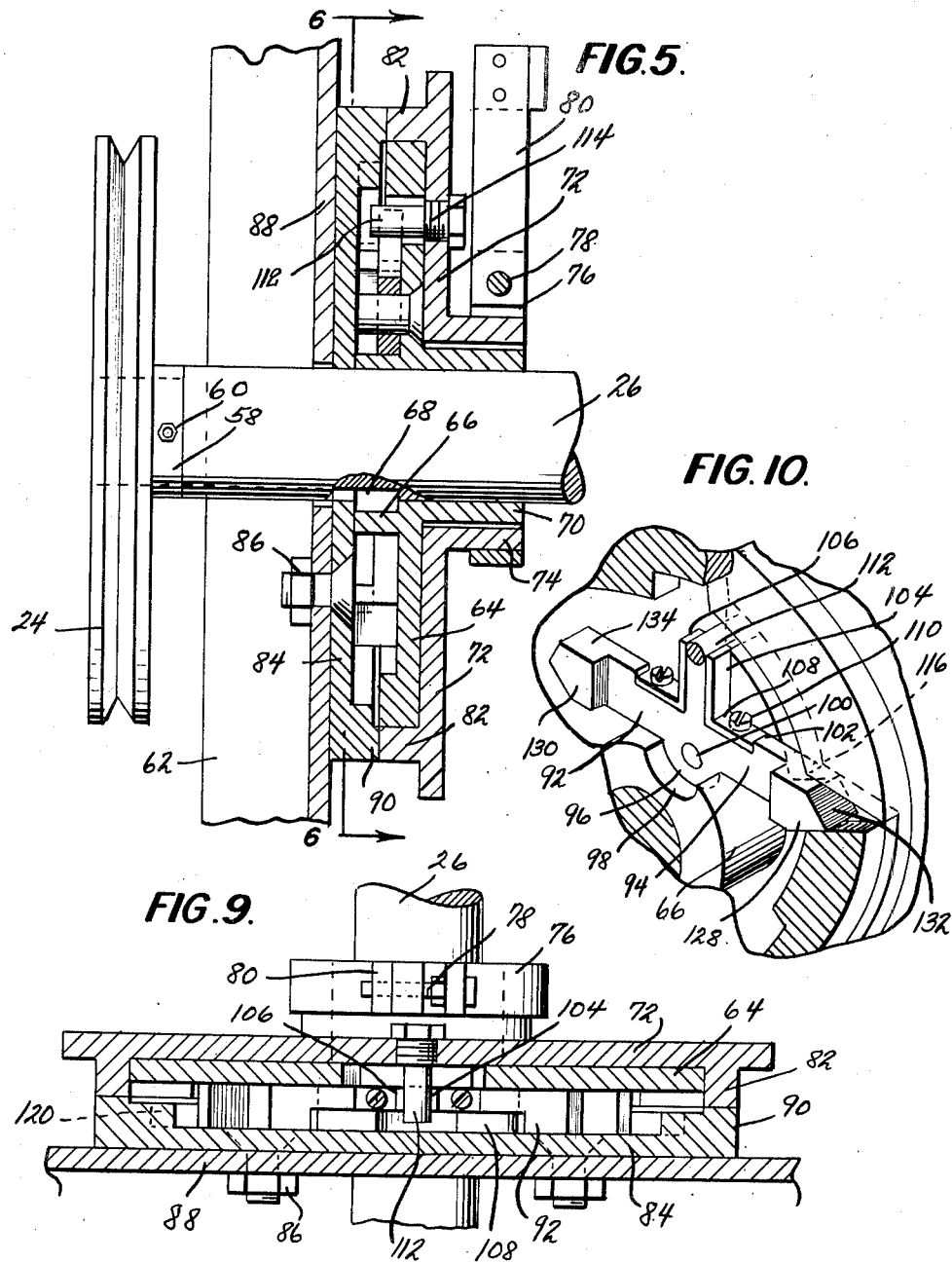

March 12, 1957

F. G. CLARK 2,784,820

REVERSING POWER TRANSMISSION
MECHANISM, ESPECIALLY
FOR GARDEN TRACTORS

Filed June 30, 1952

INVENTOR
FRANK G. CLARK

BY Mawhinney & Mawhinney
ATTORNEYS

United States Patent Office 2,784,820
Patented Mar. 12, 1957

2,784,820

REVERSING POWER TRANSMISSION MECHANISM, ESPECIALLY FOR GARDEN TRACTORS

Frank G. Clark, Danvers, Mass.

Application June 30, 1952, Serial No. 296,390

7 Claims. (Cl. 192—43)

This invention appertains to improvements in power transmission mechanisms and especially relates to a reverse mechanism for alternating the travel movement of a garden type tractor, so that the tractor is capable of moving forward or in reverse or idling at a neutral condition.

A primary object of this invention is to provide a reversing unit or assembly, whereby a standard type garden tractor, which is capable of moving only in a forward direction, can be moved easily and conveniently in a reverse direction or permitted to idle by an operator from his guiding position at the handle bars.

A further object of this invention is to provide a conversion unit for a standard garden type tractor, whereby the drive from the power shaft is reversible to the axle of the tractor and to provide a pawl and ratchet means for connecting the ground engaging wheels to the axle.

A conventional garden tractor consists of a frame from which handle bars extend upwardly and rearwardly, the handle bars enabling an operator to walk behind the garden tractor and guide it. Such tractors have their ground engaging wheels rotated by a belt transmission system connected to the drive shaft of an engine or motor mounted on the frame. The belt transmission system usually consists of a double speed reduction pulley or sheave, which is connected by a belt to a pulley fixed on the power shaft and which is connected by a belt to a pulley fixed to the wheel or fixed to the axle on which the ground engaging wheels are fixed. The belt, connecting the speed reduction pulley to the drive pulley on the power shaft, is normally slack and a swinging arm is pivoted on the frame and carries an idler pulley, which is engageable with the belt to take up the slack and tighten the belt, the arm being normally spring biased to disengage the idler pulley from the belt and being swung to an operative position by a control rod, which extends up along one of the handle bars and is controlled by the hand of an operator.

Such standard equipment permits the garden tractor to operate only in a forward direction and it is the purpose of this invention to provide a reversing mechanism for reversing the direction of rotation of the speed reduction pulley and the axle and to provide a pawl and ratchet mechanism for connecting the axle to the ground engaging wheels.

A further object of this invention is to provide a simple and effective mechanism which will enable garden tractors of the type noted above to be power driven in both a forward and backward direction.

Another object of this invention is to provide a power mechanism for driving a tractor in a forward and reverse direction and to provide means whereby either of the ground engaging wheels can overrun the speed of the other wheel when the tractor is guided in other than a straight path of movement.

These and ancillary objects and structural features of merit are attained by this invention, the preferred embodiment of which is set forth in the following description and illustrated in the accompanying drawings, wherein:

Figure 1 is a side elevational view of a portion of a conventional garden type tractor unit, embodying the reversible power drive mechanism of this invention;

Figure 2 is an enlarged side elevational view;

Figure 3 is a top plan view;

Figure 4 is a detailed sectional view taken on line 4—4 of Figure 3;

Figure 5 is a vertical sectional view taken on line 5—5 of Figure 1 and illustrating the means drivingly connecting the axle to the ground engaging wheels;

Figure 9 is a cross-sectional view taken on line 9—9 of Figure 6; and,

Figure 10 is a detailed perspective view of one of the pawls.

Figure 6:
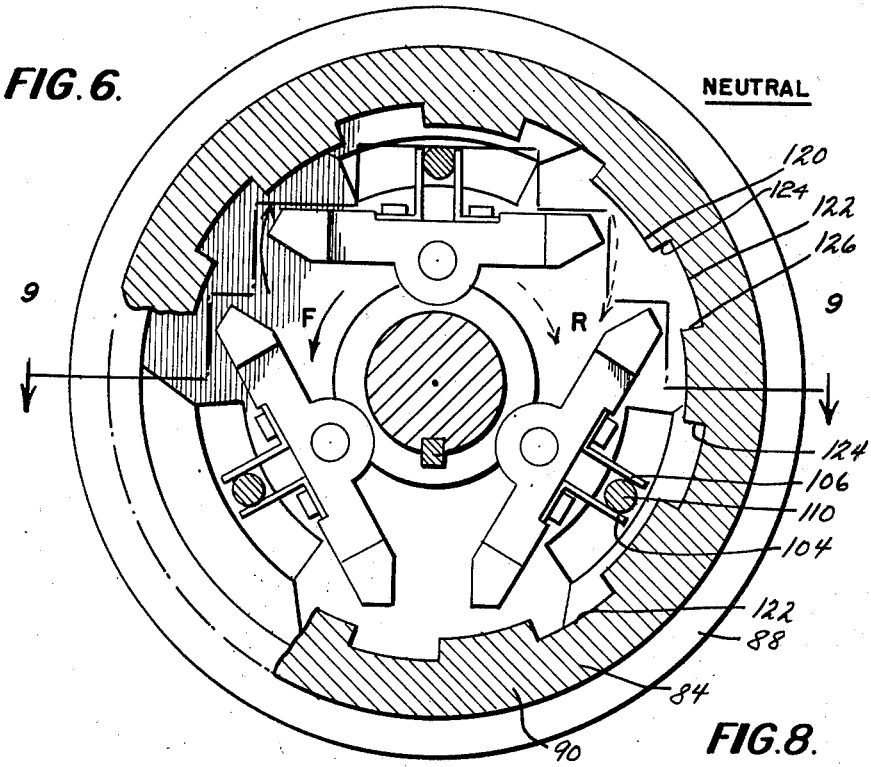
Figure 6 is a vertical sectional view taken on line 6—6 of Figure 5.

Referring now more particularly to the accompanying drawings, and initially to Figures 1-4, there is illustrated a fragmentary portion of a conventional garden type tractor, which is provided with an engine or motor from which extends a drive shaft having a double drive pulley 10 attached thereto. Forming a part of the belt transmission mechanism to operate the tractor in a forward direction is the belt 12, which is disposed around the inner part of the double drive pulley or sheave 10 and which is extended around a double speed reduction sheave or pulley 14. The speed reduction pulley is rotatably mounted on a stub shaft 16, which is carried by an upstanding bracket 18 mounted on the frame 20. A driven belt 22 is extended around the reduced portion 24 of the speed reduction pulley 14 and is disposed about a pulley 24 that is attached to the axle 26, which supports the ground engaging wheels.

The belt 12 is of the V-type and, as seen in Figure 4, the pulley 14 has a V-shaped peripheral groove 30 to receive the belt. The belt 12 is normally slack and a movable belt tightener is mounted on the frame 20 and controlled by an operator to drivingly connect the pulleys 10 and 14. The belt tightener includes a swinging arm 32, which is pivoted as at 34 to the frame 20 and which carries intermediate its ends an idler pulley 35, that is engageable with the belt 12 to take up the slack and tighten the belt. At the upper end of the arm, an operating rod 36 is pivotally attached, the rod extending upwardly and rearwardly alongside one of the upwardly inclined handle bars of the tractor. The rod 36 terminates at its outer or free end in a lateral extension 38, which forms a handle therefor. A spring 40 is connected at one end to the swinging arm 32, intermediate the pivot 34 and the idler pulley 35 and is attached at its other end to the frame 20, so that the spring 40 serves to constantly urge the idler pulley 35 out of engagement with the belt 12. When the idler pulley 35 is not engaged with the belt, this permits the drive pulley 10 to idle and the pulley 14 is not rotated.

To drive the tractor forwardly, the operator pulls the operating rod 36 rearwardly to press the idler pulley 35 against the belt 12 and thereby tighten the belt about the driving pulley 10 and the speed reduction pulley 14.

The described components are conventional and permit only forward movement of the tractor upon actuation of the engine.

The standard drive pulley 10 is usually a double one but, in an instance where a single pulley forms one of the standard components, it will be necessary to provide a double pulley of the type illustrated. To the outer part of the double pulley and forming a part of my invention, a belt 42 is attached. The belt extends around a driven pulley 44 and is normally slack. The driven pulley 44 is rotatably carried by the upper end of a swingable arm 46, which is pivoted at its lower end, as at 48, to the tractor frame 20. Intermediate the ends of the arm 46, an operating rod 50, similar to the rod 36, is pivoted. The rod 50 extends up alongside the rod 36. The arm 46 is pivoted in front of the speed reduction pulley 14, so that it can be moved toward the periphery of the speed reduction pulley. The pulley 44 is carried by the arm, so that it lies outwardly of the pulley 14, as seen in Figure 3, and a friction wheel 52 is secured to the pulley 44 at its inner side. The friction wheel 52 has a V-shaped periphery 54, complemental to the groove 30 in the pulley 14, and lies in the same plane as the pulley 14 and is disposed within the belt 12. A spring 56 is connected at one end to the frame and at its other end to the arm 46 intermediate the pivot 48 and the rod 50 and serves to move the arm about pivot 48 and urge the periphery 54 of the wheel 52 out of engagement with the groove 30 in the pulley 14. By pulling the rod 50 rearwardly, the arm 46 is moved about its pivot 48, against the opposition of the spring 56 to bring the periphery 54 of the friction wheel 52 to bear in the groove 30 and rotate the pulley 14, the belt 42 being tightened by the rearward movement of the pulley 44. The belt 42, thus, rotates the pulley 44 from the drive pulley 10 and the pulley 14 is rotated in a clockwise direction to reverse the pulley 24 and axle 26. Of course, the rod 36 has been released from its manually held position and the spring 40 has returned the arm 32 and idler pulley 35 to their normal position, with the belt 12 becoming slackened.

Thus, the direction of rotation of the axle 26 is reversed and by pulling rod 36 rearwardly and pushing rod 50 forwardly, the direction of rotation can be changed to move the tractor forwardly. When the rods 36 and 50 are both released, both belts 12 and 42 will be slackened and the tractor will be in a neutral condition.

Referring to Figure 5 of the drawings, it will be noted that the pulley 24 has a hub 58 which is fixed by set screw 60 to the outer end of the axle 26. The axle 26 is driven by the pulley 24 and a ratchet and pawl means is provided for each of the ground engaging wheels 62 to drivingly connect the axle to the wheels.

The ratchet and pawl means includes a pawl supporting plate 64, which has a hub 66 that is secured by a key 68 to the axle, so that the hub 66 is fixedly circumposed on the axle and the plate 64 extends radially therefrom. A collar 70 extends from the plate 64 in the opposite direction to the hub 66 and is coaxial with the hub, the collar encompassing the axle 26. A pawl actuating disk 72 is disposed inwardly, with respect to the wheels, of the pawl carrying plate 64 and is formed with a hub 74 that is disposed around the collar 70. A split band 76 encircles the hub 74, the ends of the band 76 being connected by an adjustable bolt assembly 78 and one end having an upstanding extension 80 which is adapted to be fixed to the frame 20 of the tractor unit. The band 76 is frictionally fitted on the hub 74 and is adjustable so that it constantly tightly engages the hub to restrain the pawl actuating disk 72 from rotation.

An annular flange 82 laterally extends outwardly from the pawl actuating disk 72 and is spaced inwardly from the periphery of the disk to overlie the periphery of the pawl carrying plate 64, which is rotatable with the axle 26.

A ratchet plate 84 is fixed by bolts 86 to the inside of the wheel hub 88 and has an annular, laterally extending peripheral flange 90 that projects inwardly to a point immediately adjacent to the free end of the flange 82, the flanges 90 and 82 enclosing the pawl and ratchet components.

The pawls 92, as seen in Figures 6 and 10, include bars 94, having centrally disposed semi-circular offsets 96 formed on one side edge, the offsets being rockably mounted within semi-circular pockets or recesses 98 formed in spaced fashion in the periphery of the hub 66 of the pawl carrying plate 64. The semi-circular offsets 96 are pivoted in the pockets 98 by pivot pins 100 which extend laterally from the pawl carrying plate 64 into the pockets 98. The pawls 92 are, thus, mounted on the outer face of the pawl carrying plate 64 between the plate 64 and the plate 84 and are grouped around the hub 66. The semi-circular offset 96 on each pawl is formed on the inner side edge of each of the pawls and an axial cutout 102 is formed in the outer or opposing side edge of each of the pawls. Parallel spring fingers 104 and 106 have their lateral mounting feet 108 anchored by screws 110 within the cutouts 102.

The fingers 104 and 106 are disposed in confronting spaced relation and extend radially from the hub 66. The fingers 104 and 106 are adapted to engage the shank of a pin 112, which is fixed by the threaded portion 114 of the shank to the pawl actuating disk 72. The pins 112 project through arcuate transverse slots 116 formed in the pawl carrying plate 64 and extend into openings 118 formed in the ratchet plate 84.

The pins 112, which, as seen in Figure 6, are spaced equidistantly in the pawl actuating disk 72 and circumferentially spaced around the axle 26, are fixed by the threads 114 to the pawl actuating disk 72 and project through the arcuate slots 116 in the pawl carrying plate 64.

The pawl actuating disk 72 is restrained against initial rotary movement by the band 76 that encompasses the hub 74 of the disk, while the pawl carrying plate 64 being fixed to the axle 26 rotates integral therewith. The ratchet plate or disk 84 is carried by the wheel 62, so that it rotates with the wheel and rotation is imparted to the ratchet plate 84 through the pawls 92.

The inner periphery of the flange 90 on the ratchet plate 84 is formed with a series of circumferentially spaced teeth or lugs 120, which are preferably irregularly spaced and interrupted by cutout portions 122. The purpose in irregularly spacing the lugs 122 is to insure that all three pawls 92 will engage the lugs at the same time. The lugs 120 are substantially rectangular, as are the cutout portions and the opposing ends 124 and 126 of the lugs are adapted to be engaged by the ends of the pawls 92. In this respect, the pawls 92 are formed with offset lug engaging ends 128 and 130. The offset lug engaging ends or portions project outwardly from the pawls 92 and have their outer ends shaped corresponding to the wedge shaped ends 132 of the pawls.

It can be seen from Figure 5 that the pawls lie in coplanar relation with the flange 92 on the pawl actuating disk 72 and that their offset ends 128 and 130 lie in a plane with the lugs 120 of the ratchet plate 84.

To limit the rocking motion of the pawls 92, abutments or teeth 120 are formed on the outer face of the pawl carrying plates 64 and are arranged concentric to the arcuate slits 116. The pawls 92 have opposing beveled ends against which the flat outer side portions of the walls of the teeth 120 abut, after the offset portions 128 or 130 are engaged with either the end 124 or the end 126 of the teeth 120.

In operation, the operator walking behind the tractor and guiding the tractor by means of the handle bars controls the rods 36 and 50 with his hands to control the forward, reverse or idling motion of the tractor. In this regard, it will be noted that the two operating rods are not provided with any latches, catches or the like, so that once they are released from their manually held position, they are immediately retracted by their springs. Thus, the safety hazard is greatly reduced in that should an operator stumble or lose his balance, while guiding the tractor, the tractor will be immediately put in a neutral condition. As seen in Figure 1, abutments 138 and 140 are secured to the frame at right angles thereto and are positioned to limit the retracting movements of the arms 32 and 52, the abutment 140 engaging the wheel 52.

When the operating rod 36 is pulled rearwardly, in the direction of the arrow in Figure 1, the idler pulley 35 slightly engages the belt 12 to tighten the belt and to transmit power from the driving pulley 10 to the speed reduction pulley 14. It will be noted that, through the provision of an idler pulley, such as the pulley 35 to tighten a driving belt, such as the belt 12, is conventional in a standard garden tractor, the relative position of the idler pulley 35 and the belt 12 is a part of this conversion unit.

In this regard, it is desirable to transmit a maximum of power from the motor or engine, since in small garden tractors there is only a small amount of power available. Therefore, it is highly desirable to transmit the maximum of this power to the tractor driving wheels with a minimum loss in the transmission. To this end, it should be noted that the forward driving belt 12 is deflected very little by the idler pulley 35, the belt engaging only a small portion of the circumference of the pulley 35 and not reeving around the pulley. The belt 12, in effect, goes directly from the driving pulley 10 to the speed reduction pulley 14 and the friction wheel 52 carried by the pulley 44 is reduced in size so that it provides a smooth and powerful reverse drive when it is brought into engagement with the pulley 14, upon actuation of the operating rod 50. Thus, by this arrangement, the maximum of power is transmitted to the driving wheels.

When the drive transmitting belt 22 is rotated, either in forward or reverse driving direction, the pulley 24 rotates the axle 26 in a corresponding direction. The pawl carrying plate 64 fixed to the axle 26, is carried by the axle, as it rotates. The pawl actuating disk 72 is initially restrained from rotary movement by the band 76 and the pins 112 are, therefore, held stationary. The pawl carrying plate 64 is allowed to rotate, without engaging the pins 112, due to the provision of the slots 116 in the pawl carrying plate. However, as the hub carrying plate 64 rotates, the pawls 92 are carried around therewith and the spring fingers 104 and 106 straddling the pins 112 rock the pawls in a direction opposite to the direction of rotation of the pawl carrying plate 64.

Figures 7, 8:
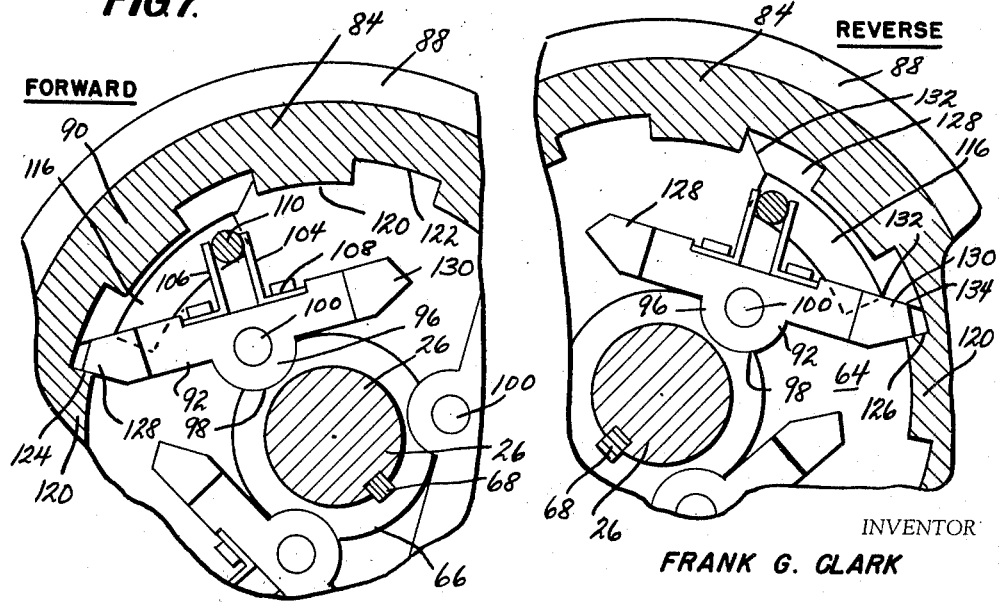
Figure 7 is an enlarged view of Figure 6 and showing the pawl and ratchet in a forward driving connection.
Figure 8 is a view similar to Figure 7 and showing the pawl and ratchet in a reverse driving connection.

Thus, as illustrated in Figure 7, wherein the pawls are shown in a forward driving position, the offset end 128 of the pawl 92 abuts against the end 124 of the lug 120 on the flange 90 of the ratchet plate 84. Similarly, the other two pawls are engaged with the ends 124 of the corresponding lugs 120 and the ratchet plate 84 is locked to the pawl carrying plate 64 and thereby to the axle 26.

In the reverse position, illustrated in Figure 8, the end 130 of the pawl 92 is engaged with the end 126 of the lug 120. The side edge 134 of the pawl end abuts against the beveled end 132 of the abutment 142, as illustrated in Figure 8, to limit the rocking movement of the pawl 92.

It can thus be seen, that on account of the retarding action of the band 76, the pawl actuating disk 72 initially remains stationary, as do the pins 112 carried thereby. The axle 26 and the pawl carrying plate 64 move as an integral part and the pawls 92 are rocked by the pins 112 to move into the openings 122 between the lugs 120 and engage one of the ends of the lugs 120, depending upon the direction of rotation of the pawl carrying plate 64. The pawls 92 are moved and held in location under the tension of the spring fingers 104 and 106, which provide a resiliency to the pawl action and allow one wheel to overrun the speed of the other when the tractor is guided in other than a straight path.

When the pawls 92 are driving the wheels 62, the raised or offset portion 128 or 130 of each of the pawls will be in engagement with the ends of the lugs 120 and the lower portion 134 at the ends will engage the beveled ends of the abutments 142.

When the directional movement of the axle 26 is changed, the pawls 92 automatically shift position to drive the tractor wheels in the new direction.

It will thus be seen that a mechanism is provided, whereby a standard type garden tractor can be power driven in either a forward or reverse direction, according to whichever operating rod 36 or 50 is pulled rearwardly by the operator and that the mechanism will be at a neutral condition, immediately when the rods are released by the operator, either intentionally or accidentally.

While the best known form of this invention has been described and herein illustrated in the drawings, it is to be understood that other embodiments may be made, such as come within the purview of the appended claims.

What is claimed as new is:

1. In a tractor drive mechanism, a driven axle, a ground engaging wheel freely disposed on the axle, a disk carried by the inside of the wheel and having a peripheral flange formed on its inside surface with spaced lugs, a pawl carrying plate fixed on the axle, pawls rockably carried by the side of said plate facing the disk and engageable with the lugs, a plate disposed on the axle, means restraining the plate against rotation upon initial rotation of the axle, pins extending laterally from said plate, said pawl carrying plate having arcuate slots receiving the pins, means carried by the pawls engageable with the pins whereby the pawl carrying plate rotates as the pins are stationary to rock the pawls into engagement with the lugs.

2. The combination of claim 1, wherein abutments are formed on the pawl carrying plate to limit the rocking movement of the pawls.

3. The combination of claim 1, wherein said means carried by the pawls includes projecting spaced parallel spring fingers on each pawl engageable on opposite sides of the pins.

4. The combination of claim 1, wherein said pawl carrying plate has a hub fixed on the axle, said hub having peripheral pockets and said pawls having central offset portions rockably mounted in the pockets.

5. In a tractor drive mechanism, a driven axle, a ground engaging wheel freely disposed on the axle, a disk carried by the inside of the wheel and having a peripheral flange formed on its inside surface with spaced lugs, a pawl carrying plate fixed on the axle, pawls rockably carried by the side of the plate facing the disk and engageable with the lugs, a carrier disposed around the axle, means restraining the carrier against rotation upon initial rotation of the axle, pins extending laterally from the carrier, said pawl carrying plate having slots receiving the pins, means carried by the pawls engageable with the pins whereby the pawl carrying plate rotates as the pins are stationary to rock the pawls into engagement with the lugs.

6. In a driver and follower combination, teeth on the follower, a pawl for drivingly engaging the teeth, a pawl carrier fast with the driver rockably carrying the pawl, a pin carrier yieldably braked against initial movement, and resilient loading means on the pawl positioned in the path of the pin to be moved by the stationary pin on initial driving movement of the pawl carrier to shift the pawl into engagement with the follower teeth.

7. In a driver and follower combination, a pawl and ratchet device between the driver and follower, and means for moving the pawl to engage the ratchet and to permit the overrunning of the driver by the follower comprising a resilient member on the pawl, and a stop member in the path of the resilient member yieldably braked against initial movement to retain resilient member against movement with the driver until a preselected degree of movement of the driver has occurred sufficient to place the resilient member under such tension as to shift the pawl into engagement with the ratchet.

References Cited in the file of this patent

UNITED STATES PATENTS

| | | |
|---|---|---|
| 901,826 | Pittman | Oct. 20, 1908 |
| 967,006 | Feile | Aug. 9, 1910 |
| 1,330,121 | Jones | Feb. 10, 1920 |
| 1,466,214 | Thompson | Aug. 28, 1923 |
| 2,531,819 | Lewis | Nov. 28, 1950 |
| 2,547,401 | Loewe et al. | Apr. 3, 1951 |
| 2,583,272 | Metzler | Jan. 22, 1952 |
| 2,602,341 | Lewis | July 8, 1952 |